United States Patent
Redmond et al.

(10) Patent No.: US 11,846,278 B2
(45) Date of Patent: Dec. 19, 2023

(54) SYSTEMS AND METHODS FOR CENTRALIZED OPTIMIZATION OF RESERVOIR PRODUCTION

(71) Applicant: Schneider Electric Systems USA, Inc., Foxboro, MA (US)

(72) Inventors: James Redmond, Richmond (CA); Scott Guimond, Gatineau (CA)

(73) Assignee: SCHNEIDER ELECTRIC SYSTEMS USA, INC., Foxboro, MA (US)

( * ) Notice: Subject to any disclaimer, the term of this patent is extended or adjusted under 35 U.S.C. 154(b) by 494 days.

(21) Appl. No.: 16/951,236

(22) Filed: Nov. 18, 2020

(65) Prior Publication Data

US 2021/0199107 A1 Jul. 1, 2021

Related U.S. Application Data

(60) Provisional application No. 62/955,762, filed on Dec. 31, 2019.

(51) Int. Cl.
| | |
|---|---|
| *F04B 49/00* | (2006.01) |
| *G06N 20/00* | (2019.01) |
| *G06N 5/04* | (2023.01) |
| *E21B 43/24* | (2006.01) |
| *E21B 43/12* | (2006.01) |
| *F04B 47/00* | (2006.01) |
| *E21B 43/20* | (2006.01) |

(Continued)

(52) U.S. Cl.
CPC ............ *F04B 49/00* (2013.01); *E21B 43/121* (2013.01); *E21B 43/20* (2013.01); *E21B 43/24* (2013.01); *E21B 47/008* (2020.05); *E21B 49/087* (2013.01); *F04B 47/00* (2013.01); *F04B 49/065* (2013.01); *G06N 5/04* (2013.01); *G06N 20/00* (2019.01)

(58) Field of Classification Search
CPC ........ F04B 49/00; G06N 20/00; E21B 47/008
USPC ................................................. 700/275–290
See application file for complete search history.

(56) References Cited

U.S. PATENT DOCUMENTS

| | | | |
|---|---|---|---|
| 6,012,015 A * | 1/2000 | Tubel ..................... | E21B 47/12 |
| | | | 702/6 |
| 10,458,207 B1 * | 10/2019 | Matringe ................ | E21B 47/11 |

(Continued)

OTHER PUBLICATIONS

Nabil, Ahlam. Assessment of measurement methods used in oil production. Diss. University of Leoben, 2011.pp. 1-203 (Year: 2011).*

(Continued)

*Primary Examiner* — Satish Rampuria
(74) *Attorney, Agent, or Firm* — Stinson LLP

(57) ABSTRACT

Centrally optimizing production of a reservoir that has a plurality of wells comprises monitoring production of each well in the reservoir using one or more respective sensors at each well. Sensor data indicative of the monitored production of each well from the one or more respective sensors is input to a central processing device for processing to evaluate the production of each well. The production of each well is evaluated to identify opportunities for optimizing production by the plurality of wells in the reservoir. In addition, one or more actions are taken using the central processing device to optimize production by the plurality of wells based on the identified opportunities for optimizing production.

6 Claims, 3 Drawing Sheets

(51) Int. Cl.
  *E21B 49/08* (2006.01)
  *E21B 47/008* (2012.01)
  *F04B 49/06* (2006.01)

(56) References Cited

U.S. PATENT DOCUMENTS

| | | | | |
|---|---|---|---|---|
| 2008/0059002 | A1* | 3/2008 | Hartkamp | G05B 15/02 700/299 |
| 2008/0288226 | A1* | 11/2008 | Gurpinar | E21B 43/00 703/10 |
| 2009/0276156 | A1* | 11/2009 | Kragas | E21B 43/12 702/6 |
| 2012/0298375 | A1* | 11/2012 | Krauss | E21B 47/009 166/369 |
| 2015/0015412 | A1* | 1/2015 | Abbassian | E21B 41/00 340/854.4 |
| 2015/0345280 | A1* | 12/2015 | Krauss | E21B 43/121 700/282 |
| 2021/0010351 | A1* | 1/2021 | Sun | E21B 41/00 |

OTHER PUBLICATIONS

Fan, Wenjia, Kim F. Hayes, and Brian R. Ellis. "Estimating radium activity in shale gas produced brine." Environmental science & technology 52.18 (2018): pp. 10839-10847. (Year: 2018).*

Williams, John, et al. "Recommendations for re-using existing wells for CO2 storage. 2019" pp. 1-47 (Year: 2019).*

Acock, Andrew, et al. "Practical approaches to sand management." Oilfield review 16.1 (2004): pp. 10-27. (Year: 2004).*

Gilliland, Ellen S., et al. "4 Monitoring Design and Data Management for a Multi-Well CO2 Storage/Enhanced Coalbed Methane Test in a Stacked Coal Reservoir, Buchanan County, Virginia, USA." (2016): pp. 52-76. (Year: 2016).*

Gupta, Sachin, et al. "Well Integrity Diagnostics and Reservoir Monitoring in Aging Completions to Arrest Decline in Gas Production: Experience from Dandewala Gas Field, Rajasthan, India." acquired Aug. 2023 pp. 1-11 (Year: 2023).*

\* cited by examiner

SYSTEMS AND METHODS FOR CENTRALIZED OPTIMIZATION OF RESERVOIR PRODUCTION

CROSS-REFERENCE TO RELATED APPLICATION

This application claims priority from U.S. Provisional Patent Application No. 62/955,762, filed Dec. 31, 2019, the entire disclosure of which is incorporated herein by reference.

BACKGROUND

The present disclosure generally relates to controlling oil and gas pump systems.

Known pump control or optimization systems operate independently and evaluate production and performance on an individual well basis. In other words, such systems optimize the production from a single well by controlling a single pump associated with the particular well. For instance, the Realift™ Rod Pump Control available from Schneider Electric provides advanced, intelligent Rod Pump Solutions for lifting liquids and can improve fluid recovery and cost reduction in oil and gas productions. This rod pump control system provides production optimization for individual sucker rod pumps, progressing cavity pumps, hydraulic lifting pumps, and the like.

Conventional techniques can only optimize the production of each pump as an individual well. With the advent of more sophisticated production approaches that deploy multiple wells to a single reservoir, the production of a particular well is immediately affected by the production and operation of surrounding wells. As an example, conventional optimization involves evaluating each individual well's performance and then optimizing the production of the individual well independently of any other wells. At most, an operator manually assesses the performance (or uses intuition) to adjust individual pumps in an attempt to improve overall performance from the formation as a whole. If performed at all, the evaluation of optimal production settings among the interdependent wells is done using manual procedures and then applied to each pump individually. This leads to the different pumps competing with each other as each pump control system is configured to maximize its own production. The conflicting systems can lead to a cycle of speed changes across each pump connected to the reservoir and, in turn, increases energy costs and reduces equipment life without achieving new net production from the formation.

SUMMARY

Aspects of the present disclosure automatically and dynamically evaluate the production across the formation as whole and then adjust the artificial lift and other affiliated equipment to maximize total production while preventing equipment damage, minimizing energy costs, improving overall performance, and so forth.

In an aspect, a method for centrally optimizing production of a reservoir that has a plurality of wells comprises monitoring production of each well in the reservoir using one or more respective sensors at each well. The method further comprises receiving sensor data indicative of the monitored production of each well from the one or more respective sensors at an input of a central processing device and processing the sensor data on the central processing device to evaluate the production of each well. The production of each well is evaluated to identify opportunities for optimizing production by the plurality of wells in the reservoir. In addition, the method includes taking one or more actions using the central processing device to optimize production by the plurality of wells based on the identified opportunities for optimizing production.

In another aspect, a reservoir production system includes a plurality of sensors each associated with a respective well of a plurality of wells in a reservoir. The sensors generate sensor data indicative of production of the respective wells. A central processing device is receiving and responsive to the sensor data. The system also includes a memory device storing computer-executable instructions that, when executed by the central processing device, configure the central processing device for evaluating the production of each well based on the sensor data to identify opportunities for optimizing production by the wells and for taking one or more actions to optimize production by the wells based on the identified opportunities for optimizing production.

In yet another aspect, a reservoir production controller includes a central processing device and a memory device storing computer-executable instructions. The central processing device is receiving and responsive to sensor data gathered by a plurality of sensors each associated with a respective well of a plurality of wells in a reservoir. This sensor data is indicative of production of the respective wells. When executed by the central processing device, the computer-executable instructions configure the central processing device for evaluating the production of each well based on the sensor data to identify opportunities for optimizing production by the wells, generating one or more commands in response to the evaluating, and communicating the commands to one or more control elements configured to control the production of each well for taking actions to optimize production by the wells based on the identified opportunities.

Other objects and features of the present invention will be in part apparent and in part pointed out herein.

BRIEF DESCRIPTION OF THE DRAWINGS

Corresponding reference characters indicate corresponding parts throughout the drawings.

DETAILED DESCRIPTION

Figure 1:
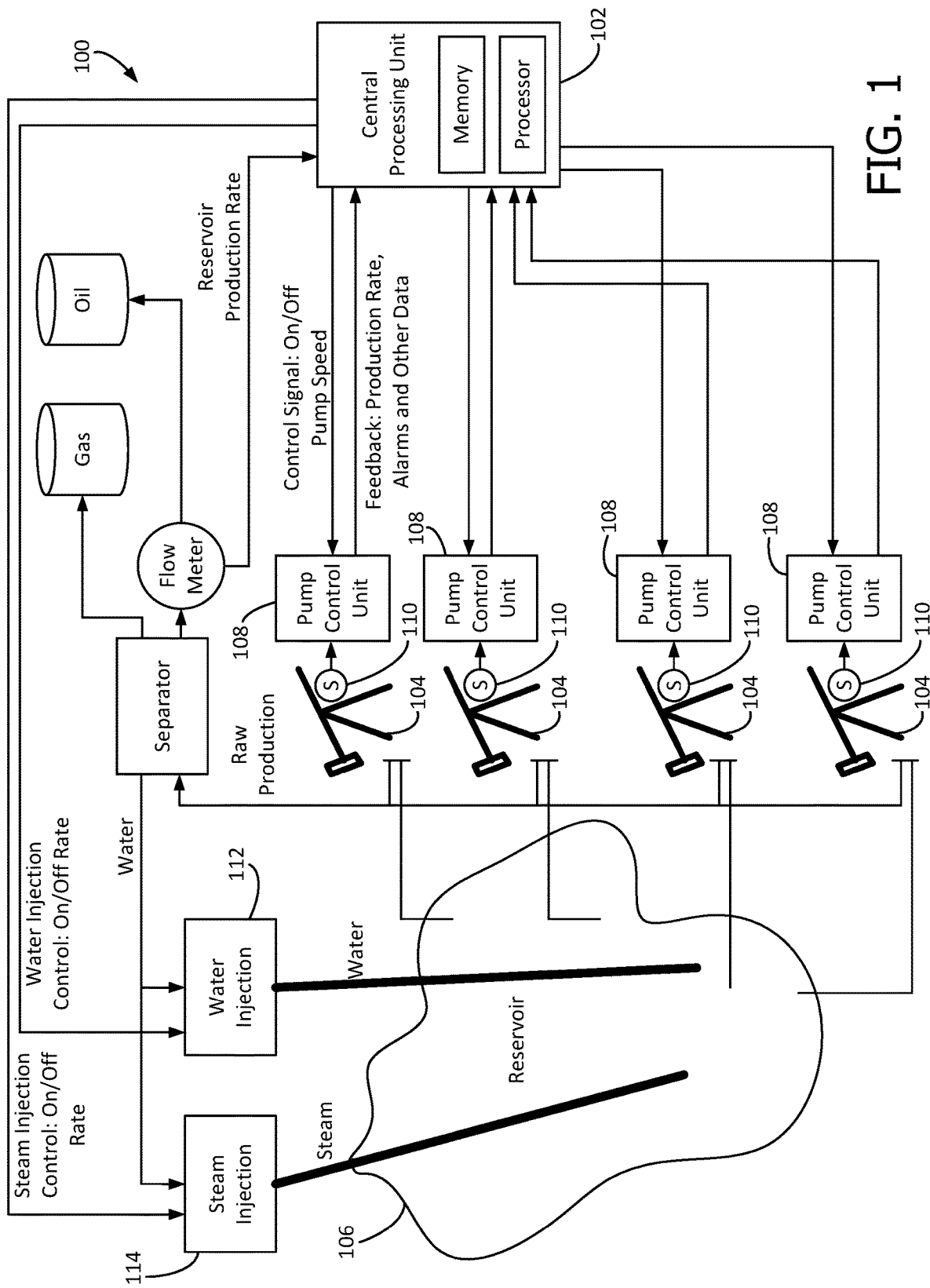
FIG. 1 is a diagram of a pump control system according to an embodiment of the present disclosure.

Referring to the drawings, FIG. 1 illustrates a system 100 in which a central processing unit 102 evaluates the performance of each pump 104 of a plurality of pumps associated with a reservoir 106. The central processing unit 102 is responsive to production data from each pump 104 to evaluate its performance. As shown, a pump control unit 108 corresponds to each pump 104 for collecting pump production data and the like and implementing control of the pump.

In operation, central processing unit 102 evaluates the production from each well using a sensor 110. In an embodiment, each pump control unit 108 receives sensor signals associated with the corresponding pump 104 from the sensor 110 coupled to the particular pump and communicates the signals to central processing unit 102. In an alternative embodiment, central processing unit 102 receives the sensor signals directly from sensors 110 and/or calculates the production from each well based on the operating parameters and other information available from pump control unit 108.

The sensor 110 includes, for example, a load cell (and/or strain gauge) and/or a position sensor. In addition, sensor 110 includes a signal conditioner for one or both of the load cell and position sensor (or a separate signal conditioner for each of the load cell and position sensor), a data processor such as a PLC and associated memory, a power supply, and a data transmitter for transmitting sensor signals to the pump control unit 108 (or directly to central processing unit 102). An analog to digital converter may be included in any one or more of the components of sensor 110 to convert analog signals into digital signals that may be more easily processed.

In another embodiment, sensor 110 and pump control unit 108 comprise an integrated sensor and control component package, which includes a load cell (and/or strain gauge), a position sensor, a signal conditioner for one or both of the load cell and position sensor (or a separate signal conditioner for each of the load cell and position sensor), a data processor such as a PLC and associated memory, a power supply, and a data transmitter for transmitting sensor and/or control signals. An analog to digital converter may be included in any one or more of the components of the integrated sensor and control component package to convert analog signals into digital signals that may be more easily processed by, for example, the data processor. The control signals may be selected based on one or more signals provided by the load cell (and/or strain gauge), one or more signals provided by the position sensor, or by a combination of signals provided by the load cell (and/or strain gauge), and the position sensor.

In response to commands from central processing unit 102, the pump control unit 108 turns on and off its associated pump 104 and controls the pump's speed. To optimize the production from the system as a whole, the central processing unit 102 also controls a water injection system 112 and/or a gas injection system 114.

In an alternative embodiment, central processing unit 102 performs the pump off controller functions, such as alarms, monitoring the total net oil production of the reservoir 106, and controlling whether or not each pump 104 runs and its speed. In this embodiment, central processing unit 102 receives sensor data directly from sensors 110 and communicates commands directly to the plurality of pumps 104 without the need for the separate pump control units 108.

Commonly assigned U.S. Patent Application Publication No. 2015/0345280 and U.S. Patent Application Publication No. 2012/0298375, the contents of which are incorporated herein by reference in their entirety, disclose methods and apparatuses for controlling a pump configured to pump liquid out of a well.

As explained above, conventional pump control or optimization systems evaluate production and performance of an individual well basis. Advantageously, aspects of the present disclosure evaluate the performance of individual wells but provides optimal production settings among interdependent wells to prevent competition among competing pumps 104. The system 100 of FIG. 1 automatically evaluates the production of each well in a formation's reservoir 106 and applies automated algorithms to maximize the production from the reservoir 106 as a whole incorporating control of all of the connected pumps 104 along with ancillary equipment such as water and steam injection systems 112, 114.

In an embodiment, aspects of the present disclosure use a single processing unit, i.e., central processing unit 102, to monitor the production from more than one well, directly or indirectly, while controlling each well's pump 104 with a view to optimizing the production from the entire reservoir 106 of a single formation. The system 100 comprises a set of pump control units 108 connected to the central processing unit 102.

Based on the production, central processing unit 102 controls each pump control unit 108 to adjust the speed and operation of its associated pump 104 such that the total production across the reservoir 106 (i.e., the total output of all connected pumps 104) is maximized even if the individual performance of particular wells are not. Preferably, the various components of system 100, namely, central processing unit 102, pump control units 108, water injection system 112, and/or steam injection system 114 communicate with each other wirelessly (e.g., via cellular or radio frequency).

The system 100 also incorporates other control systems used to increase production from reservoir 106 such as water and/or steam injection systems 112, 114. In addition, this optimization provides valuable feedback to users on how to optimize equipment configurations (such as pump jack stroke lengths) or where to best deploy equipment.

In an embodiment, central processing unit 102 executes one or more machine learning algorithms to optimize overall production from reservoir 106 using the plurality of pumps 104. The inputs to the algorithms include pump fill, physical location of the pump, and amount of daily production. Outputs of the algorithms include on/off commands, speed commands, and water/steam injection parameters (e.g., on/off and volume).

The machine learning algorithms executed by central processing unit 102 further take into account water and steam injection. For instance, the system 100 can learn to reduce production from a particular pump 104 located near a water injection site immediately following water injection. In this manner, central processing unit 102 controls the pumps 104 and the water and steam injection systems 112, 114 to have a synergistic relationship.

Figure 2:
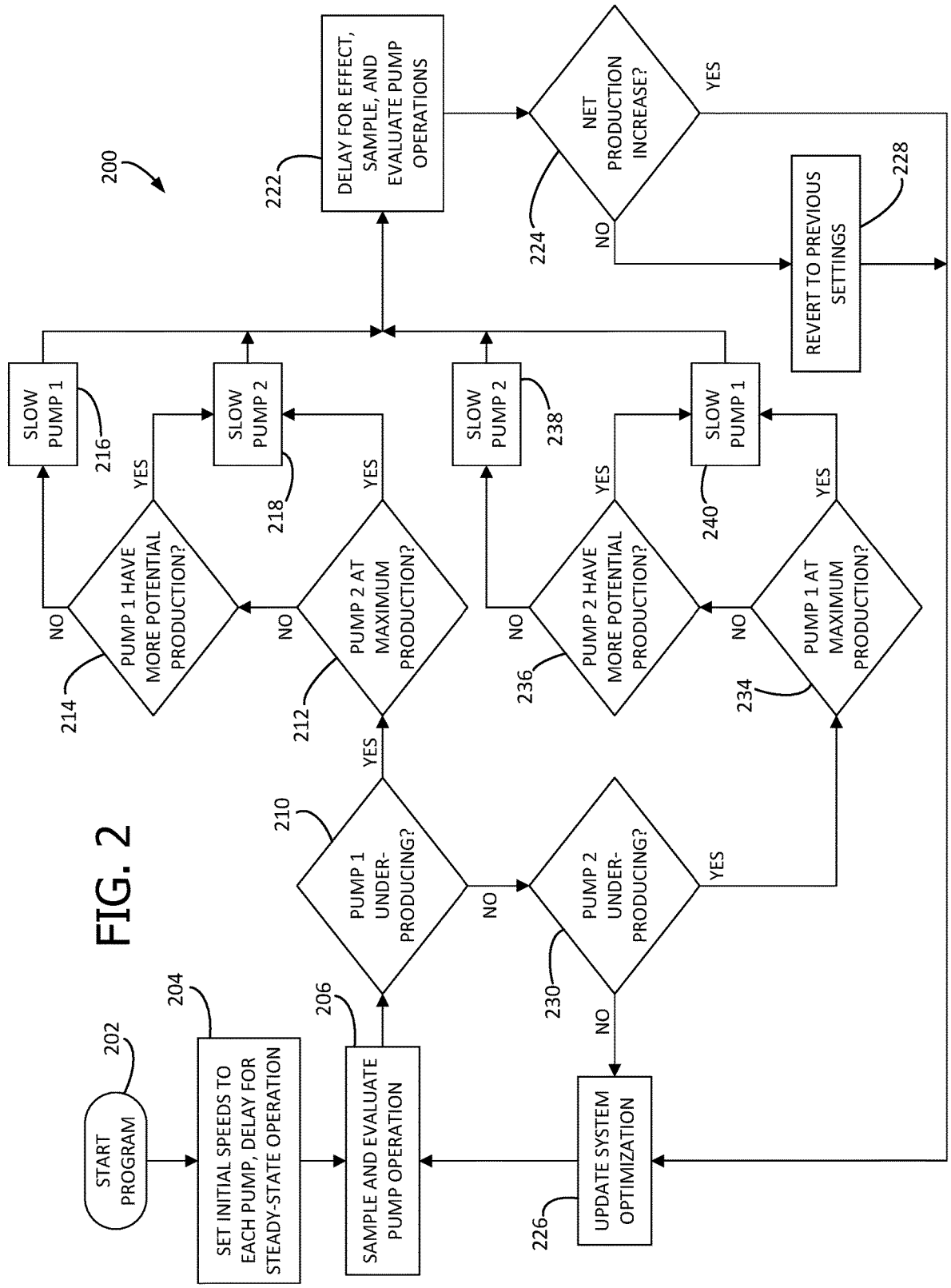
FIG. 2 is a flow diagram of an example process for operating the pump control system of FIG. 1.

Referring now to FIG. 2, a flow diagram 200 illustrates an example process in the form of computer-executable instructions executed by central processing unit 102 for optimizing overall production from reservoir 106 according to aspects of the present disclosure. For purpose of illustration, code for operating two pumps 104 begins at 202.

Proceeding to 204, central processing unit 102 commands each of the two pumps 104 via the respective pump control unit 108 to operate at a predetermined initial speed and implements a predetermined delay period so that reservoir system 100 can achieve steady state operation. At 206, central processing unit 102 samples the production data via sensors 110 to evaluate pump operation. If the sensor data reveals at 210 that the first pump 104 (designated Pump 1) is under-producing, central processing unit 102 determines at 212 whether the second pump (designated Pump 2) is at maximum production and determines at 214 whether Pump 1 has additional production available. If Pump 2 is not operating at maximum production and Pump 1 does not have more potential production, central processing unit 102 commands Pump 1 to reduce speed at 216. On the other hand, if Pump 2 is operating at maximum production or Pump 1 has more potential production, central processing unit 102 commands Pump 2 to reduce speed at 218.

At 222, central processing unit 102 again implements a predetermined delay period so that reservoir system 100 can achieve steady state operation before reevaluating the pump production data. If the speed changes have resulted in a net production increase, central processing unit 102 updates system optimization at 226. But if net production did not increase, central processing unit 102 commands the pump control units 108 to revert to the previous speed settings at 228 and returns to 206 for further optimization.

Referring further to FIG. 2, if the sensor data reveals at 210 that Pump 1 is not under-producing, central processing unit 102 determines at 230 whether Pump 2 is under-producing. If not, the process returns to update system optimization at 226. But if Pump 2 is under-producing, central processing unit 102 determines at 234 if Pump 1 is at maximum production and determines at 236 whether Pump 2 has additional production available. If Pump 1 is not operating at maximum production and Pump 2 does not have more potential production, central processing unit 102 commands Pump 2 to reduce speed at 238. On the other hand, if Pump 1 is operating at maximum production or Pump 2 has more potential production, central processing unit 102 commands Pump 1 to reduce speed at 240. Proceeding to 222, central processing unit 102 again implements a predetermined delay period so that reservoir system 100 can achieve steady state operation before reevaluating the pump production data. If the speed changes have resulted in a net production increase at 224, central processing unit 102 updates system optimization at 226. But if net production did not increase, central processing unit 102 commands the pump control units 108 to revert to the previous speed settings at 228 and returns to 206 for further optimization.

Each time the system optimization is updated at 226, the results are stored in memory. The stored values, in an embodiment, include the ultimate change in net production (within a limited deadband) and the time to achieve this effect. Additional information can be stored (e.g., the change in energy consumption (lift cost), pump intake pressure, change in gas/oil ratio or water cut, etc.) to refine the optimization. When in a learning mode, system 100 is configured to adjust the operation more frequently to build a set of events. Once a sufficient catalog of events is stored, system 100 enters a production mode and then seeks to match current production by the wells of reservoir 106 to a stored event. The system 100 is further configured to select the event that corresponds to the current situation and results in the best net production increase and uses that to adjust the operation of pumps 104. The results are then stored in another event. Based on the memory and processing capabilities of central processing unit 102, the number of events can be stored by category (e.g. Pump 1 net production much greater than Pump 2 net production or Pump 2 net production slightly greater than Pump 1 net production), and in each category the events will buffered by time; as the maximum number of events in a category is exceeded, older events will be discarded from memory and no longer used in the analysis.

Figure 3:
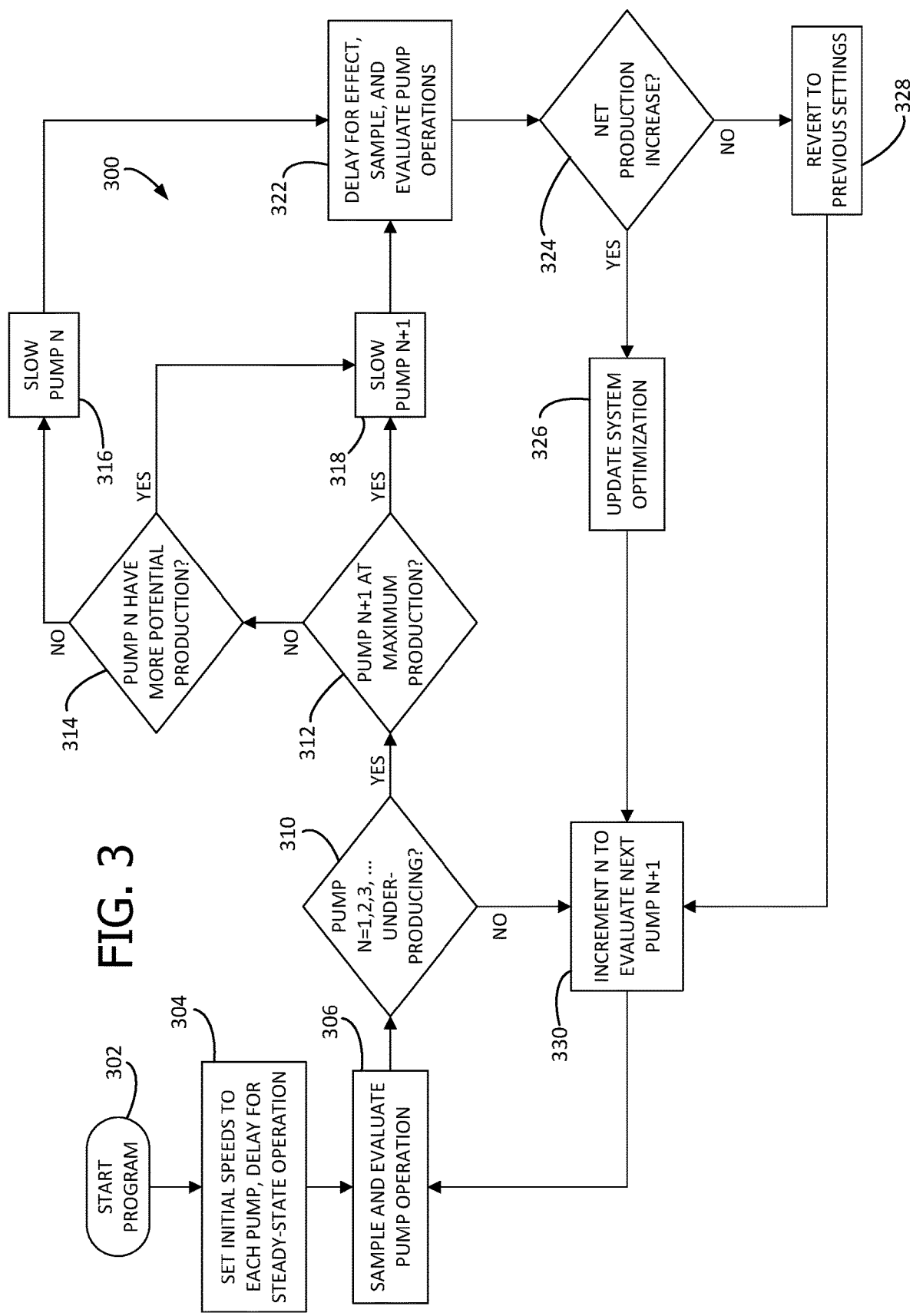
FIG. 3 is a flow diagram of another example process for operating the pump control system of FIG. 1.

FIG. 3 is a flow diagram 300 illustrating an example process in the form of computer-executable instructions executed by central processing unit 102 for optimizing overall production from reservoir 106 according to aspects of the present disclosure. For purposes of illustration, code for operating a plurality of pumps 104 begins at 302.

Proceeding to 304, central processing unit 102 commands each of the pumps 104 via the respective pump control unit 108 to operate at a predetermined initial speed and implements a predetermined delay period so that reservoir system 100 can achieve steady state operation. At 306, central processing unit 102 samples the production data via sensors 110 to evaluate pump operation. If the sensor data reveals at 310 that pump 104 (designated pump N, where N=1, 2, 3, . . . ) is under-producing, central processing unit 102 determines at 312 whether the next pump 104 (designated Pump N+1) is at maximum production and determines at 314 whether the pump 104 has additional production available. If Pump N+1 is not operating at maximum production and Pump N does not have more potential production, central processing unit 102 commands Pump N to reduce speed at 316. On the other hand, if Pump N+1 is operating at maximum production or Pump N has more potential production, central processing unit 102 commands the Pump N+1 to reduce speed at 318.

At 322, central processing unit 102 again implements a predetermined delay period so that reservoir system 100 can achieve steady state operation before reevaluating the pump production data. If the speed changes have resulted in a net production increase at 324, central processing unit 102 updates system optimization at 326. But if net production did not increase, central processing unit 102 commands the pump control units 108 to revert to the previous speed settings at 328. Proceeding to 330, central processing unit 102 increments the value of N by one to evaluate the performance of Pump N+1 and returns to 306 for further optimization. It is to be understood that the next iteration would examine Pump N+2, then Pump N+3, and so forth.

In operation, one or more sensors 110 monitor production of each well of a plurality of wells in reservoir 106 and generate sensor data indicative of the monitored production of each well. The central processing device 102 receives the sensor data from the one or more respective sensors 110 and executes computer-executable instructions, including one or more machine learning algorithms, stored in a memory device that, when executed, configure central processing device 102 for processing the received the sensor data. The central processing device 102 processes the sensor data to evaluate the production of each well to identify opportunities for optimizing production by the plurality of wells in reservoir 106 and to take one or more actions to optimize production by the plurality of wells based on the identified opportunities for optimizing production. The actions include generating, by central processing device 102, one or more commands in response to the processing and communicating the commands to one or more control elements in the reservoir production process. In response to the commands, the reservoir production system automatically operates the control elements to optimize production by the plurality of wells in the reservoir. Automatically operating the control elements comprises controlling pump 104 associated with each of the wells and/or injecting water or steam into the reservoir at an injection site and further controlling pump 104 associated with at least one of the wells based on a location of the pump relative to the injection site. The machine learning algorithms evaluate the production of each well based on at least one of the following: the sensor data, a water injection parameter, a steam injection parameter, and a pump speed.

Embodiments of the present disclosure may comprise a special purpose computer including a variety of computer hardware, as described in greater detail below.

For purposes of illustration, programs and other executable program components may be shown as discrete blocks. It is recognized, however, that such programs and components reside at various times in different storage components of a computing device, and are executed by a data processor(s) of the device.

Although described in connection with an exemplary computing system environment, embodiments of the aspects of the invention are operational with other special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the invention may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments of the aspects of the invention may be implemented with processor-executable instructions. The processor-executable instructions may be organized into one or more processor-executable components or modules on a tangible processor readable storage medium. Aspects of the invention may be implemented with any number and organization of such components or modules. For example, aspects of the invention are not limited to the specific processor-executable instructions or the specific components or modules illustrated in the figures and described herein. Other embodiments of the aspects of the invention may include different processor-executable instructions or components having more or less functionality than illustrated and described herein.

The order of execution or performance of the operations in embodiments of the aspects of the invention illustrated and described herein is not essential, unless otherwise specified. That is, the operations may be performed in any order, unless otherwise specified, and embodiments of the aspects of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the aspects of the invention by way of example and not by way of limitation. This description enables one skilled in the art to make and use the aspects of the invention, and describes several embodiments, adaptations, variations, alternatives and uses of the aspects of the invention, including what is presently believed to be the best mode of carrying out the aspects of the invention. Additionally, it is to be understood that the aspects of the invention are not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. It is contemplated that various changes could be made in the above constructions, products, and process without departing from the scope of aspects of the invention. In the preceding specification, various preferred embodiments have been described with reference to the accompanying drawings. It will, however, be evident that various modifications and changes may be made thereto, and additional embodiments may be implemented, without departing from the broader scope of the aspects of the invention as set forth in the claims that follow. The specification and drawings are accordingly to be regarded in an illustrative rather than restrictive sense.

In view of the above, it will be seen that several advantages of the aspects of the invention are achieved and other advantageous results attained.

The Abstract and Summary are provided to help the reader quickly ascertain the nature of the technical disclosure. They are submitted with the understanding that they will not be used to interpret or limit the scope or meaning of the claims. The Summary is provided to introduce a selection of concepts in simplified form that are further described in the Detailed Description. The Summary is not intended to identify key features or essential features of the claimed subject matter, nor is it intended to be used as an aid in determining the claimed subject matter.

What is claimed is:

1. A method for centralized optimization of a reservoir production process, comprising:
    monitoring production of each well of a plurality of wells in a reservoir using one or more respective sensors at each well;
    receiving sensor data indicative of the monitored production of each well from the one or more respective sensors at an input of a central processing device;
    processing the sensor data on the central processing device to evaluate the production of each well, wherein the production of each well is evaluated to identify opportunities for optimizing production by the plurality of wells in the reservoir, wherein the processing comprises executing, by the central processing device, one or more machine learning algorithms;

taking one or more actions using the central processing device to optimize production by the plurality of wells based on the identified opportunities for optimizing production, wherein taking one or more actions comprises:

generating, by the central processing device at an output, one or more commands in response to the processing, and communicating the commands to one or more control elements in the reservoir production process; and automatically operating the control elements in response to the commands to optimize production by the plurality of wells in the reservoir, wherein automatically operating the control elements comprises injecting water or steam into the reservoir at an injection site and controlling a pump associated with at least one of the wells based on a location of the pump relative to the injection site.

2. The method of claim 1, wherein the one or more machine learning algorithms evaluate the production of each well based on at least one of the following: the sensor data, a water injection parameter, a steam injection parameter, and a pump speed.

3. A reservoir production system, comprising:

a plurality of sensors each associated with a respective well of a plurality of wells in a reservoir, the sensors generating sensor data indicative of production of the respective wells;

one or more control elements configured to control the production of each well;

a central processing device receiving and responsive to the sensor data; and a memory device storing computer-executable instructions that, when executed by the central processing device, configure the central processing device for:

executing one or more machine learning algorithms to evaluate the production of each well based on the sensor data, wherein the production of each well is evaluated to identify opportunities for optimizing production by the plurality of wells in the reservoir;

generating one or more commands in response to the evaluating to optimize production by the plurality of wells based on the identified opportunities for optimizing production;

communicating the commands to the one or more control elements;

automatically operating the control elements in response to the commands to optimize production by the plurality of wells in the reservoir, wherein the control elements comprise a pump associated with each of the wells and one or more injection systems for injecting at least one of water and steam into the reservoir at an injection site; and controlling the pump associated with at least one of the wells based on a location of the pump relative to the injection site.

4. The reservoir production system of claim 3 wherein the one or more machine learning algorithms evaluate the production of each well based on at least one of the following: the sensor data, a water injection parameter, a steam injection parameter, and a pump speed.

5. A reservoir production controller, comprising:

a central processing device receiving and responsive to sensor data gathered by a plurality of sensors each associated with a respective well of a plurality of wells in a reservoir, the sensor data indicative of production of the respective wells; and a memory device storing computer-executable instructions that, when executed by the central processing device, configure the central processing device for:

executing one or more machine learning algorithms to evaluate the production of each well based on the sensor data, wherein the production of each well is evaluated to identify opportunities for optimizing production by the plurality of wells in the reservoir;

generating one or more commands in response to the evaluating;

communicating the commands to one or more control elements configured to control the production of each well for taking one or more actions to optimize production by the plurality of wells based on the identified opportunities for optimizing production, wherein the control elements comprise a pump associated with each of the wells and one or more injection systems for injecting at least one of water and steam into the reservoir at an injection site;

automatically operating the control elements in response to the commands to optimize production by the plurality of wells in the reservoir; and controlling the pump associated with at least one of the wells based on a location of the pump relative to the injection site.

6. The reservoir production controller of claim 5, wherein the one or more machine learning algorithms evaluate the production of each well based on at least one of the following: the sensor data, a water injection parameter, a steam injection parameter, and a pump speed.

* * * * *